(12) United States Patent
Shyam Sunder et al.

(10) Patent No.: US 12,130,843 B2
(45) Date of Patent: Oct. 29, 2024

(54) DEVICE AND METHOD FOR PREPARING DATA

(71) Applicant: Siemens Aktiengesellschaft, Munich (DE)

(72) Inventors: Swathi Shyam Sunder, Bengaluru (IN); Tobias Aigner, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/263,852

(22) PCT Filed: Jan. 27, 2022

(86) PCT No.: PCT/EP2022/051868
§ 371 (c)(1),
(2) Date: Aug. 1, 2023

(87) PCT Pub. No.: WO2022/167310
PCT Pub. Date: Aug. 11, 2022

(65) Prior Publication Data
US 2024/0119067 A1 Apr. 11, 2024

(30) Foreign Application Priority Data
Feb. 2, 2021 (EP) .................................. 21154744

(51) Int. Cl.
*G06F 16/00* (2019.01)
*G06F 16/21* (2019.01)
*G06F 16/28* (2019.01)

(52) U.S. Cl.
CPC .......... *G06F 16/285* (2019.01); *G06F 16/211* (2019.01)

(58) Field of Classification Search
CPC ...... G06F 16/285; G06F 16/211; G06F 16/28; G06F 16/254; G06F 16/258
See application file for complete search history.

(56) References Cited

U.S. PATENT DOCUMENTS

| | | | |
|---|---|---|---|
| 10,346,401 B2* | 7/2019 | Abolhassani | ..... G06F 16/24549 |
| 2012/0102022 A1* | 4/2012 | Miranker | .............. G06F 16/258 |
| | | | 707/E17.014 |

(Continued)

FOREIGN PATENT DOCUMENTS

CN 111813798 A 10/2020 ........... G06F 16/242

OTHER PUBLICATIONS

Search Report for International Application No. PCT/EP2022/051868, 17 pages, Jun. 20, 2022.

(Continued)

*Primary Examiner* — Cheryl Lewis
(74) *Attorney, Agent, or Firm* — Slayden Grubert Beard PLLC

(57) ABSTRACT

Various embodiments of the teachings herein include a computer-aided method for transforming data in a relational database, containing sensor measurements, into RDF data blocks of a graph database. The method may include: providing a R2RML mapping file; breaking down and converting the data using the mapping file and a first mapping parser; generating a generation of RDF data blocks; and storing the generation as a database. After the data have been broken down and converted, checking a quality of the obtained R2RML mapping and creating a second R2RML mapping file, on the basis of which the relational data are broken down and converted into RDF data blocks. The second R2RML mapping, during the preparation of the relational data into RDF data blocks, automatically stops the processing of relational data that are not to be (Continued)

resolved and thus optimizes the energy efficiency of the preparation.

18 Claims, 10 Drawing Sheets

(56) References Cited

U.S. PATENT DOCUMENTS

2014/0214857 A1* 7/2014 Srinivasan .............. G06F 16/80
                                                          707/748
2015/0205880 A1* 7/2015 Perry ................ G06F 16/24532
                                                          707/771

OTHER PUBLICATIONS

Franck, Michel et al: "A survey of RDB to RDF translation approaches and tools"; XP055514262, May 1, 2014.

Gulnar, Mehdi et al: "Ontology-based integration of performance related data and models: An application to industrialturbine analytics"; 2017 IEEE 15th International Conference on Industrial Informatics (INDIN), IEEE; 24. pp. 251-256, XP033252069, Apr. 24, 2017.

Konstantinou, Nikolaos et al: "Incremental Export of Relational Database Contents into RDF Graphs"; Web Intelligence, Mining and Semantics (WIMS14), ACM; pp. 1-8, XP058050020, Jun. 2, 2014.

Dimou, Anastasia et al., "Assessing and Refining Mappings to RDF to Improve Dataset Quality," SAT 2015 18th International Conference, Lecture Notes In Computer Science, pp. 133-149, Oct. 11, 2015.

Randles, Alex et al., "A Framework for Assessing and Refining the Quality of R2RML Mappings," Proceedings of the 22nd International Conference on Information Integration and Web-based Applications & Services, URL:https://dl.acm.org/doi/pdf/10.1145/3428757.3429089, 5 pages, Nov. 30, 2020.

* cited by examiner

FIG 1A

```
@prefix rr: <http://www.w3.org/ns/r2rml#> .
@prefix foaf: <http://xmlns.com/foaf/0.1/> .
@prefix ex: <http://example.com/> .
@prefix xsd: <http://www.w3.org/2001/XMLSchema#> .
@base <http://example.com/base/> .

<TriplesMap1>
    a rr:TriplesMap;

rr:logicalTable [ rr:tableName "Student" ];

rr:subjectMap [ rr:template "http://example.com/{Name}" ];

rr:predicateObjectMap
    [
      rr:predicate foaf:name ;
      rr:objectMap [ rr:column "Name" ]
    ]
    .
```

FIG 1B

| | Subject | Predicate | Object |
|---|---|---|---|
| 1 | <http://example.com/base/TriplesMap1> | <http://www.w3.org/ns/r2rml#logicalTable> | t10625 |
| 2 | <http://example.com/base/TriplesMap1> | <http://www.w3.org/ns/r2rml#predicateObjectMap> | t10624 |
| 3 | <http://example.com/base/TriplesMap1> | <http://www.w3.org/ns/r2rml#subjectMap> | t10626 |
| 4 | <http://example.com/base/TriplesMap1> | rdf:type | <http://www.w3.org/ns/r2rml#TriplesMap> |
| 5 | t10623 | <http://www.w3.org/ns/r2rml#column> | Name |
| 6 | t10624 | <http://www.w3.org/ns/r2rml#objectMap> | t10623 |
| 7 | t10624 | <http://www.w3.org/ns/r2rml#predicate> | foaf:name |
| 8 | t10625 | <http://www.w3.org/ns/r2rml#tableName> | Student |
| 9 | t10626 | <http://www.w3.org/ns/r2rml#template> | http://example.com/{Name} |

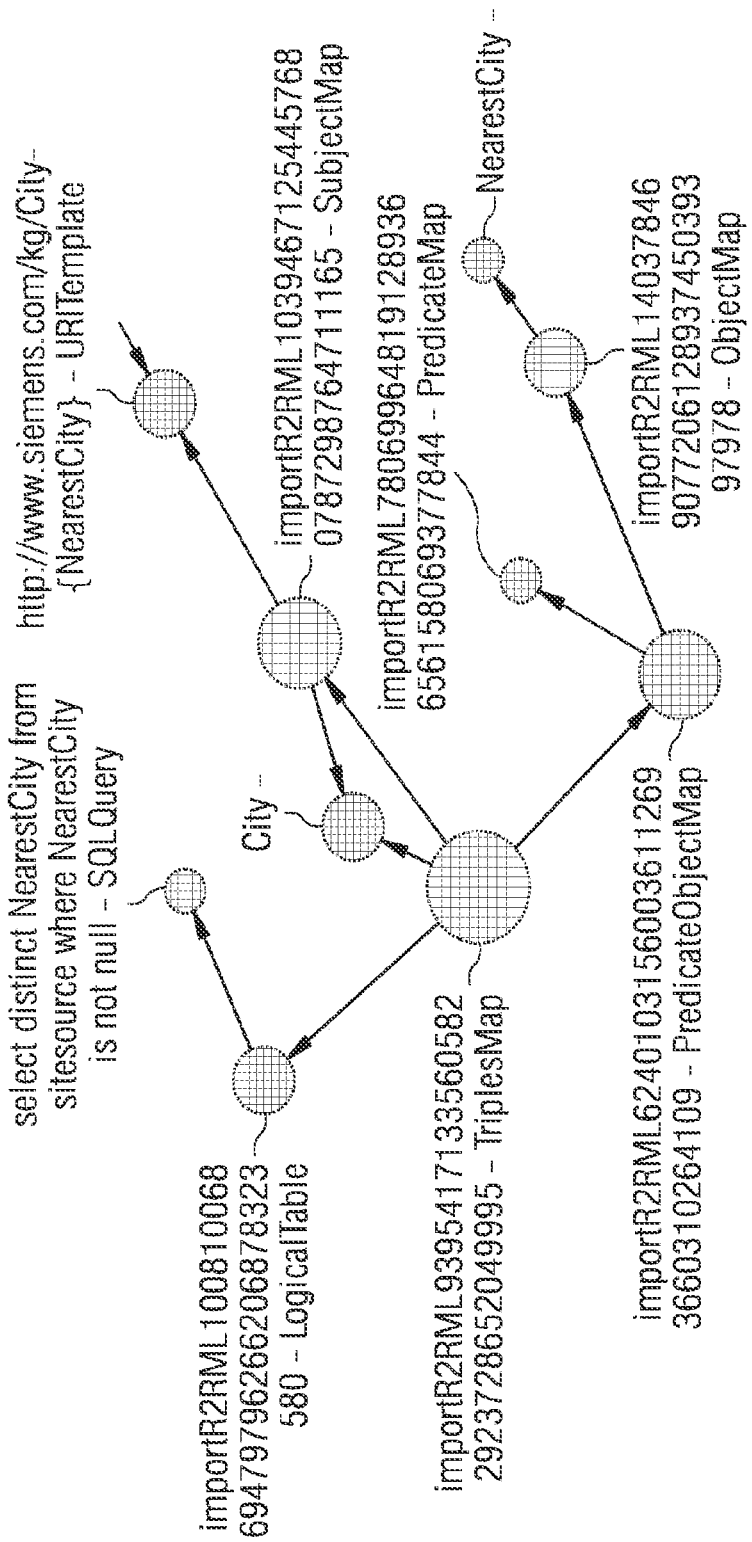

DEVICE AND METHOD FOR PREPARING DATA

CROSS-REFERENCE TO RELATED APPLICATIONS

This application is a U.S. National Stage Application of International Application No. PCT/EP2022/051868 filed Jan. 27, 2022, which designates the United States of America, and claims priority to EP Application No. 21154744.3 filed Feb. 2, 2021, the contents of which are hereby incorporated by reference in their entirety.

TECHNICAL FIELD

The present disclosure relates to data management. Various embodiments of the teachings herein include devices and/or methods for preparing and/or assigning data in a relational database, in particular containing sensor data, to data blocks of a graph database by way of R2RML. "R2RML" stands for "RDB to RDF Mapping Language", wherein "RDB" is the abbreviation for "relational database" and "RDF" is the abbreviation for "Resource Description Framework".

BACKGROUND

The "RDF" (Resource Description Framework) is an Internet protocol and denotes a technical interpretation on the Internet for formulating logic statements about any things (resources). In order to have globally unambiguous identifiers for resources, these are to this end formed by convention in the same way as "URL" (Uniform Resource Locator). Data may thus be displayed automatically and in a meaningful manner worldwide in a uniform manner to humans.

Such preparation of relational data, such as for example sensor data, is used for example to forward sensor data from an industrial installation, which are present in a manner stored in the form of columns and rows, that is to say data in a relational database, for training purposes to an artificial intelligence, wherein the device may optionally also comprise a display device for displaying the transformation or the progress of the transformation, and the method involves assigning data in a relational database to RDF data blocks and thus makes it possible to generate an RDF data block and/or comprises transferring the data to a graph database.

Relational databases are a central component in modern IT infrastructures. The data stored in relational databases are used to directly control and regulate not only devices and/or machines, but also entire power supply systems, traffic control systems, industrial automated installations, etc.

Relational database systems contain any heterogeneous data, these database systems being based on a collection of tables in which datasets in the form of columns and rows are captured and/or stored. These data are present and stored in a structured manner in the databases. They are able to be recognized and used automatically based on their coordinates in the tables.

In order to prepare the data, the data in a relational database are converted into data in a graph database. This involves synchronizing, transforming and/or translating data into a form that is able to be processed further for storage in the form of a graph database. The data preparation may also be the first step in data analysis projects and may comprise a large number of discrete tasks.

The preparation of relational data—RDB format—to produce data in the RDF format is used in technical processes as a basis for automated control and regulation operations, because the resulting data, which may serve as a basis for graph databases, in RDF format unlike the generated and/or collected data in the RDB format—are able to be read and processed using machines. It is therefore imperative in automated technical processes that data are first of all collected, for example using sensors, monitoring devices such as cameras, recordings of surface properties, roughnesses, measured data about rheology, stress moduli, etc.; these data—just like many data from devices with longer service lives, such as steam turbines—are generally present in the RDB format as relational data and these relational source data in the RDB format are second of all converted into machine-processable and/or machine-readable data in the RDF format, because industrial regulation and control devices, such as heating systems, running speed of a belt, movements of a robot, opening and closure of a valve and the like, predominantly work with graph data in the RDF format.

In this context, the data in a relational database are first of all assigned to RDF data blocks in a user-defined manner. The assignment to RDF data blocks offers the possibility of displaying existing relational data in the RDF data model.

An RDF data block always comprises three units, subject, predicate and object, wherein a resource is described in more detail as subject with another resource or a value as object. With a further resource as predicate, these three units form a triple. The RDF model is a data model with well-defined formal semantics based on directed graphs. Data in RDF are statements about resources. The statements are in this case modeled as a triple. The set of triples forms a—for example mathematical—graph and is referred to as RDF model. The triple in the RDF model is a statement that consists of subject, predicate and object. The set of triples forms a mathematical graph and is referred to as RDF model. By way of example, graph databases and/or Google Knowledge Graph are based on this representation and storage of data.

A resource is something that is unambiguously identified and about which it is desired to make a statement. Subject and predicate are always resources. The object may be either a resource or only a literal, wherein a literal is additional information, for example datum information or a truth value.

Data preparation is generally the first step in all methods that aim to generate data-controlled applications based on heterogeneous data. The preparation of data stored in relational databases is however still hampered by a number of errors, because the transformation of relationally stored data and those that are correlated with one another via graphs is difficult and complex.

Use is already made of a large number of methods with the aid of which the data in a relational database are able to be transferred to a graph database, but R2RML, a language for expressing user-defined assignments of relational databases to RDF data blocks, has proven itself here. Such assignments offer the possibility of displaying existing relational data in the RDF data model on an output device and/or in a memory, expressed in a structure and a target vocabulary selected by the assigning party. R2RML assignments themselves are RDF graphs and are recorded in the Turtle syntax.

R2RML enables various types of mapping implementations. Processes or generally R2RML units may for example offer a virtual SPARQL endpoint using the assigned relational data or generate RDF dumps or automatically offer an interface for linked data.

SPARQL (SPARQL Protocol and RDF Query Language) is a graph-based query language for RDF. The RDF model is a data model with defined formal semantics that is based on directed graphs—unlike table-based relational databases.

"Mapping" or "data mapping" is the name given to the process that maps data elements between different data models. Data mapping is implemented for example by way of graphic mapping tools that automatically create executable transformation programs. In the case of the so-called "data-driven mapping" under discussion here, an attempt is made, based on heuristics and statistics, to automatically also recognize complex mappings between two data sources, wherein data portions, data combinations or arithmetic relationships are recognized. It is thus also possible to recognize exceptions that do not correspond to the recognized mapping logics, that is to say that may be errors.

Using the R2RML assignment under discussion here, data from a predefined relational data source, for example from sensors, measuring devices, industrial controllers, etc., are assigned to one or more linguistically compiled and/or formally ordered representations "graphs" of a set of terms and the relationships between them in a specific subject area. These R2RML assignments, which take place automatically, then form a basis for the storage of these data in a graph database or an RDF file.

Examples of an industrial knowledge graph are depictions in the form of graphics consisting of nodes and paths between the nodes, wherein the nodes, for example in industrial systems, represent physical objects, such as sensors, industrial controllers and/or control systems such as PLCs, that is to say "programmable logic controllers", robots, machines, drives, tools, elements in a parts list or other hardware components, but may also correspond to more abstract entities such as attributes and configurations of these physical objects, such as production plans and machine, robot and/or device properties. An abstract entity is for example an IP address, a data type or an application that is executed by an industrial system.

FIGS. 1a to 1c—prior art—show how—represented in Turtle syntax—the R2RML map of FIG. 1a is represented in the form of triples and how, in FIG. 1b, this then results graphically in the form of a triple map, that is to say TripleMap, as shown in FIG. 1c.

Such an R2RML triple map "R2RML TripleMap" may for example be depicted on an output and/or display device such as a monitor, as shown in FIG. 2.

The R2RML assignment is for example visualized graphically on a display device. In this case, node points that are connected via paths are shown, as illustrated for example in FIG. 2—prior art.

FIG. 3 shows the diagram of the known R2RML process: data in a relational database 1 are routed, via a first R2RML unit 2 for preprocessing and/or data mining, for example in the form of an R2RML mapping file here, via a first interface 3 into an R2RML module 4. In the R2RML module 4, the data are prepared by an R2RML parser 5 and an RDF data generation 6 is generated therefrom. Using a final, that is to say last interface 7 of the R2RML module 4, this RDF data generation 6 is stored in the memory 8 as a database of a graph database or as an RDF data block. In this case—as illustrated in dashed form—the assignment that has taken place may optionally be depicted using a computer-implemented ontology process 9. Such a depiction 9 is reproduced in FIG. 2.

SUMMARY

One disadvantage of the known method and the known device comprising the R2RML module is that this assignment is susceptible to errors due to various complex method steps. However, these errors first become apparent when reading the memory 8. Unfortunately, during visualization using the ontology process 9, due to the complexity thereof—see FIG. 2—it is not possible to identify errors here. There is thus the need for a quality check—in some instances able to be performed automatically—when transforming data in a relational database into a graph database by way of an R2RML processor.

The object of the present invention is therefore to overcome the disadvantages of the prior art and to specify a device for preparing relational data to form data blocks as a database of a graph database by way of R2RML and a method for transforming relational data by way of R2RML, which method makes it possible to recognize the quality of the R2RML mapping and provides improvements and optimizations, as a result of which it is possible to optimally prepare the relational data in a more economic, more energy-efficient and faster manner.

For example, some embodiments include an R2RML module (4) for preparing relational data to form RDF data blocks, having at least one interface (3, 7, 10 and 12) to at least one storage area (6, 8, 17) for storing the generated RDF data blocks, at least one interface (3) to a preprocessing means (1, 2), at least one interface to a display means (9), at least one interface to a parser (5, 11) and one or more processors, configured to generate at least one RDF data block generation, and one or more R2RML parsers (5) that are suitable for receiving relational data, for breaking them down and for converting them into first R2RML mappings, and at least one storage area (6, 17) for storing the generated RDF data blocks, wherein the R2RML module (4) is suitable, by way of a first R2RML parser (5), for assigning received relational data (1) to RDF data blocks using the R2RML mapping rules and for storing them in a storage area (6, 8, 17) as corresponding RDF data blocks, characterized in that provision is made for one or more processors that are configured to generate a second R2RML mapping (14) as a result of a quality check, downstream of the first R2RML parser (5), on the first R2RML mapping performed by an R2RML unit (13), and provision is made for at least one further interface (10, 12, 15), by way of which the second R2RML mapping (14) is able to be transmitted, wherein the second R2RML mapping, during the preparation of the relational data into RDF data blocks, automatically stops the processing of relational data that are not to be resolved and thus optimizes the energy efficiency of the preparation.

In some embodiments, provision is made for an interface (15) via which an R2RML unit (16) within the R2RML module (4) receives the second R2RML mapping file (14).

In some embodiments, the R2RML unit (16), after receiving the second R2RML mapping file (14), automatically starts an optimization process.

In some embodiments, the R2RML unit (16) starts a process for optimizing the mapping on the basis of the second R2RML mapping file (14).

In some embodiments, the optimization process in the R2RML module (4) triggers the generation of multiple RDF data block generations, which are stored in corresponding storage areas (17).

In some embodiments, the optimization process in the R2RML module (4) triggers the parallel and simultaneous generation of multiple RDF data block generations, which are stored in corresponding storage areas (17).

In some embodiments, the R2RML module (4) is connected to a processor that is suitable for preprocessing (1, 2) the R2RML mapping of relational data such as sensor data via an interface (3, 7, 10, 12).

In some embodiments, the R2RML module (4) is connected to a processor that is suitable for depicting buffer-stored data of one or more first and/or second R2RML mappings using an ontology (9) for visualization.

In some embodiments, provision is made, in an R2RML unit, for an ontology (9) for comparison with the second R2RML mapping file (14).

In some embodiments, an output device is connected to the R2RML unit (9) and visualizes the result of the comparison of the second R2RML mapping file (14) with the ontology.

As another example, some embodiments include a computer-aided method for transforming data in a relational database, containing sensor measurements, into RDF data blocks of a graph database, the method comprising: providing relational data in a relational database (1), providing a first R2RML mapping file (2), breaking down and converting the relational data (1) with the aid of the first R2RML mapping file (2) by way of a first R2RML mapping parser (5), generating at least one generation of RDF data blocks (6), and storing (8) the generation of RDF data blocks as a database for a graph database and/or an RDF file, characterized in that, after the data have been broken down and converted by a first R2RML parser (5), the quality of the obtained R2RML mapping is checked (13) and improved (14) and at least one second R2RML mapping file (14) is created, on the basis of which the relational data (1) are broken down and converted into RDF data blocks, wherein the second R2RML mapping, during the preparation of the relational data into RDF data blocks, automatically stops the processing of relational data that are not to be resolved and thus optimizes the energy efficiency of the preparation.

In some embodiments, the second R2RML mapping file (14) is already generated in the preprocessing.

In some embodiments, the second R2RML mapping file (14) is generated within the R2RML module (4).

In some embodiments, an optimized transformation method of the data mapping is set in process using the additional R2RML unit (16).

In some embodiments, multiple RDF data block generations are generated using the optimized transformation method of the R2RML mapping.

In some embodiments, multiple RDF data block generations are generated simultaneously, that is to say in parallel, within the method using the optimized transformation method of the R2RML mapping.

In some embodiments, the result of the at least one R2RML mapping parser is routed to a further R2RML unit (9) for comparison with an ontology and possibly for visualization.

As another example, some embodiments include a computer program containing a program code for performing one or more of the methods described herein when the program code is executed on a computer.

As another example, some embodiments include a computer program product comprising a program code stored on a machine-readable data carrier for performing one or more of the methods described herein when the program code is executed on a computer.

BRIEF DESCRIPTION OF THE DRAWINGS

FIGS. 1a to 1c depict prior art, represented in Turtle syntax, showing how the R2RML map of FIG. 1a is represented in the form of triples and how, in FIG. 1b, this then results graphically in the form of a triple map, that is to say TripleMap, as shown in FIG. 1c;

FIG. 7 is a diagram showing a marked and magnified detail of the example from FIG. 6;

DETAILED DESCRIPTION

Figure 1C:
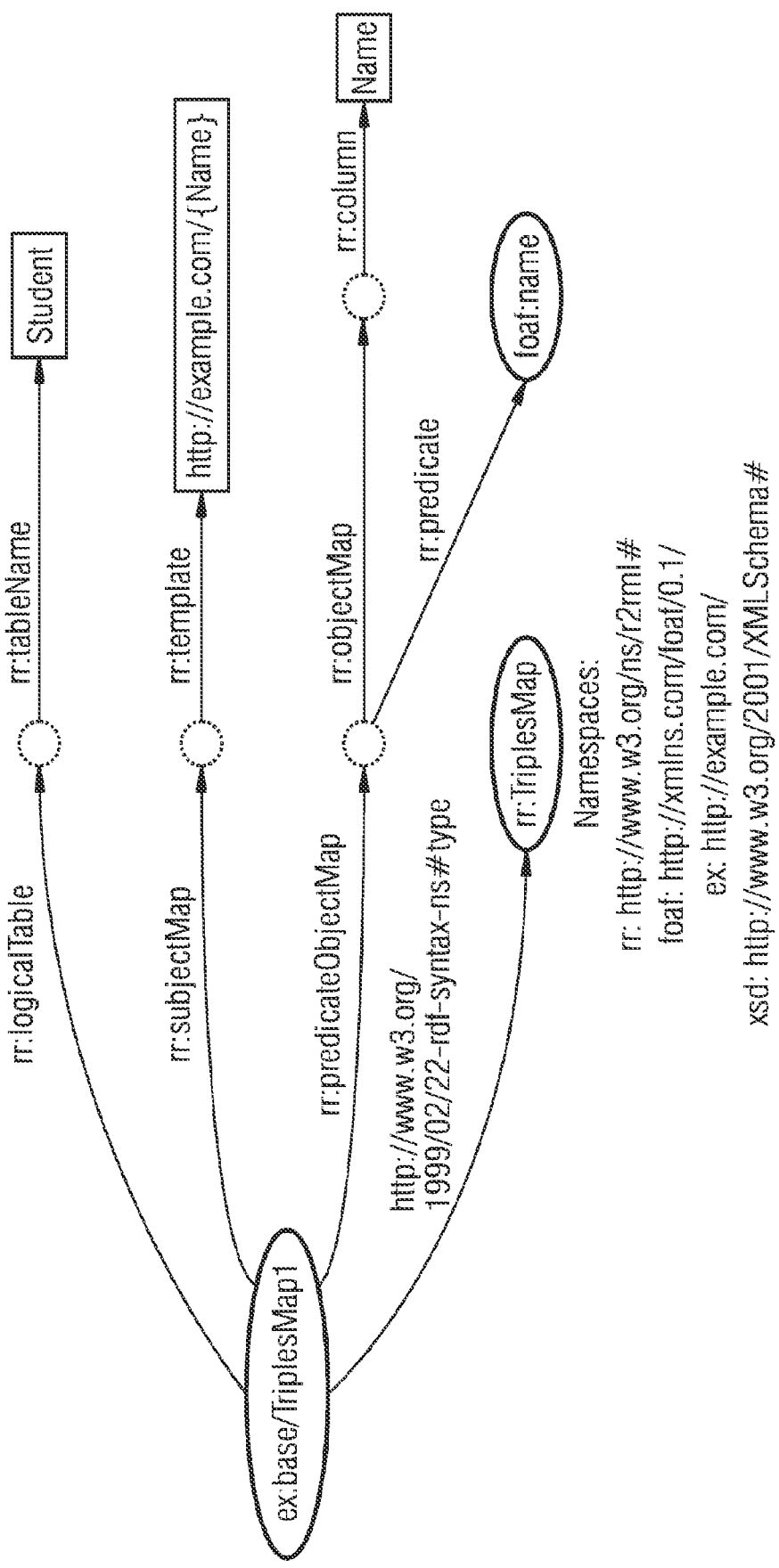

The teachings of the present disclosure include an R2RML module for preparing relational data to form RDF data blocks, having
- at least one interface to at least one storage area for storing the generated RDF data blocks,
- at least one interface to a preprocessing means,
- at least one interface to a display means,
- at least one interface to a parser and
- one or more processors, configured to generate at least one RDF data block generation, and
- one or more R2RML parsers that are suitable for receiving relational data, for breaking them down and for converting them into first R2RML mappings,
- at least one storage area for storing the generated RDF data blocks, wherein
- the R2RML module is suitable, by way of a first R2RML parser, for assigning received relational data to RDF data blocks using the first R2RML mapping and for storing them in a storage area as corresponding RDF data blocks, characterized in that
- provision is made for one or more processors that are configured
- to generate a second R2RML mapping as a result of a quality check, downstream of the first R2RML parser, on the first R2RML mapping performed by an R2RML unit, and
- provision is made for at least one further interface, by way of which the second R2RML mapping is able to be transmitted, such that the energy efficiency of the preparation of the relational data is optimized compared to that without the generation of a second R2RML mapping, because the second R2RML mapping, during the preparation of the relational data into RDF data blocks, automatically stops the processing of relational data that are not to be resolved and thus optimizes the energy efficiency of the preparation.

Some embodiments include a computer-aided method for transforming data in a relational database, containing sensor measurements, into RDF data blocks of a graph database, the method comprising:
providing relational data in a relational database,
providing a first R2RML mapping file, breaking down and converting the relational data with the aid of the first R2RML mapping file by way of a first R2RML mapping parser, generating at least one generation of RDF data blocks, and storing the generation of RDF data blocks as a database for a graph database and/or an RDF file, characterized in that, after the data have been broken down and converted by a first R2RML parser, the quality of the obtained R2RML mapping is checked and improved and at least one second R2RML mapping file is created, on the basis of which the relational data are broken down and converted into RDF data blocks, wherein the second R2RML mapping, during the preparation of the relational data into RDF data blocks, automatically stops the processing of relational data that are not to be resolved and thus optimizes the energy efficiency of the preparation.

A computer program incorporating teachings of the present disclosure is executed in a processor that carries out one or more of the methods described herein. A computer program product incorporating teachings of the present disclosure provides a machine-readable data carrier on which there is stored a computer program that carries out one or more of the methods described herein when it is executed in a processor.

In some embodiments, in a first R2RML mapping step, the data is converted into RDF data. Following this, the intermediate result is checked and/or optimized in the form of a "second R2RML mapping". The check in this case reveals which nodes and/or paths actually have to be transformed, because they are able to be translated into graph data, and for which nodes and/or paths no further transformation makes sense, because these nodes and/or paths are outliers because they are not connected or able to be connected in a meaningful manner for example to further paths and/or nodes. It is possible to save on time, costs and outlay for these R2RML mapping transformations "that lead to nothing" when using the teachings of the present disclosure.

As an example, some embodiments include a device for preparing relational data to form data blocks as a database of a graph database and/or to form RDF data blocks, which device comprises one or more processors that are configured
to preprocess the R2RML mapping of relational data such as sensor data,
to depict buffer-stored data from one or more R2RML mappings using an ontology for visualization, and having
one or more R2RML modules that
comprise one or more R2RML parsers and storage areas that are suitable for receiving relational data, for breaking them down and for converting them into R2RML mappings,
and storage units for storing the generated data blocks,
one or more display devices for optically reproducing the generated first and/or second R2RML mappings, and wherein the device furthermore comprises
one or more storage areas (8) for storing the data in a graph database and
associated interfaces (3, 7, 10, 12 and 15), wherein
the R2RML module of the device is suitable, by way of an R2RML mapping parser, for assigning received relational data to RDF data blocks using the R2RML mapping rules and storing them in a storage unit as corresponding RDF data blocks, in particular such that one or more processors of the device are also configured to generate a second R2RML mapping file as result of a quality check, downstream of the first R2RML parser, performed by an R2RML unit, and
provision is made for a further interface, by way of which the second R2RML mapping file is able to be transmitted, as part of the preprocessing, to the R2RML module via an interface and/or to one or more R2RML units within the R2RML module via another interface.

In some embodiments, the R2RML module contains at least one further R2RML unit, derived from the second R2RML mapping file (14), sets an optimized transformation method of the data mapping in process, in particular one for generating and storing optimized and/or multiple generations of RDF data blocks.

In some embodiments, provision is made to provide a depiction according to an ontology from the second R2RML mapping file, see FIGS. 6 to 9.

In some embodiments, the method is a computer-implemented error analysis method carried out by one or more R2RML units in order to perform a quality check and/or quality improvement in the case of a transformation of data in a relational database containing sensor data, comprising columns and rows, using an R2RML method, which optionally visualizes intermediate results in the form of mappings, into data in a graph database, comprising relationships, including:
checking whether each column in the relational database in the graph database has a corresponding node point,
checking whether each row in the relational database in the graph database has a path.

The resultant graph, in the form of the second R2RML mapping file, solves the technical problem of incorrect transformation and/or assignment of metadata in a relational database into a graph database.

An "R2RML unit" denotes an element that operates in a computer-aided manner and that transforms and/or depicts relational data automatically by way of R2RML mapping rules. An R2RML unit receives data via one or more interfaces, processes them in a computer-aided manner incorporating the R2RML rules and forwards the results via one or more further interfaces. An R2RML interface (11) may be part of the preprocessing of the data, part of an R2RML module, and part of a visualization of the R2RML mapping.

A "processor" in this disclosure includes for example a machine or an electronic circuit. A processor may in particular be a main processor (central processing unit, CPU), a microprocessor or a microcontroller, for example an application-specific integrated circuit or a digital signal processor, possibly in combination with a storage unit for storing program instructions, etc. A processor may also for example be an IC (integrated circuit), in particular an FPGA (field-programmable gate array) or an ASIC (application-specific integrated circuit), or a DSP (digital signal processor) or a graphic processor GPU (graphic processing unit). A processor may also be understood to mean a virtualized processor, a virtual machine or a soft CPU. It may also for example be a programmable processor that is equipped with configuration steps for carrying out said method according to the invention or is configured, by way of configuration steps, such that the programmable processor carries out the features of the method or of the modules, or other aspects and/or partial aspects of the invention.

A "module" in this disclosure includes for example a processor and/or a storage unit for storing program code. By way of example, the processor is specifically configured to execute the program code such that the processor carries out functions in order to implement or carry out one or more of the methods described herein or a step of one of the methods. The respective modules may for example also be designed as separate or independent modules. To this end, the corresponding modules may for example comprise further elements. These elements are for example one or more interfaces (for example database interfaces, communication interfaces—for example network interfaces, WLAN interface) and/or an evaluation unit (for example a processor) and/or a storage unit. Using the interfaces, data may for example be exchanged (for example received, transmitted, sent or provided). Using the evaluation unit, data may for example be compared, checked, processed, assigned or computed in a computer-aided and/or automated manner. Using the storage unit, data may for example be stored, retrieved or provided in a computer-aided and/or automated manner.

"Ontology" denotes a usually linguistically compiled and formally ordered representation of a set of terms and the relationships that exist between them in a specific subject area. An ontology is a network of information comprising logic relationships. Ontologies, with the idea of the semantic web, have taken off in the last few years and are thus part of knowledge representation in the subarea of artificial intelligence.

"Semantic web" in this case denotes an extended World Wide Web in which data are able to be exchanged more easily between computers and are able to be exploited more easily for the computers or processors.

The teachings of the present disclosure may be used to interpret the mappings that are created based on the automated transformation by way of R2RML as far as possible as graphs themselves. In the process, graphs that visualize the improved second R2RML mapping files are created, for example.

"Parser" denotes a computer program that is able to be used to break down and convert data into a format more suitable for the further processing.

"Preprocessing" is understood to mean data cleaning, such as in particular including "data mining". This involves for example recognizing missing data or incorrect combinations, for example filtering out impossible data combinations, such as for example: "gender: male; pregnant: yes".

"Data mining" is understood to mean the systematic application of computer-aided methods in order to find patterns, trends or relationships in existing datasets.

"Computer-aided" may be understood to mean for example an implementation of the method in which in particular a processor carries out at least one method step of the method. By way of example, "computer-aided" is also understood to mean "computer-implemented".

"Provide" or "provision", in particular in connection with data, metadata and/or other information, may be understood to mean for example computer-aided provision. The provision takes place for example via an interface (for example a database interface, a network interface, an interface to a storage unit). These interfaces may be used for example to transmit and/or send and/or retrieve and/or receive corresponding data and/or information during the provision. "Provision" in connection with the invention may also be understood to mean for example loading or storing, for example of a transaction containing corresponding data. "Provision" may also be understood to mean transferring (or sending or transmitting) corresponding data from one node to another node.

Figure 3:
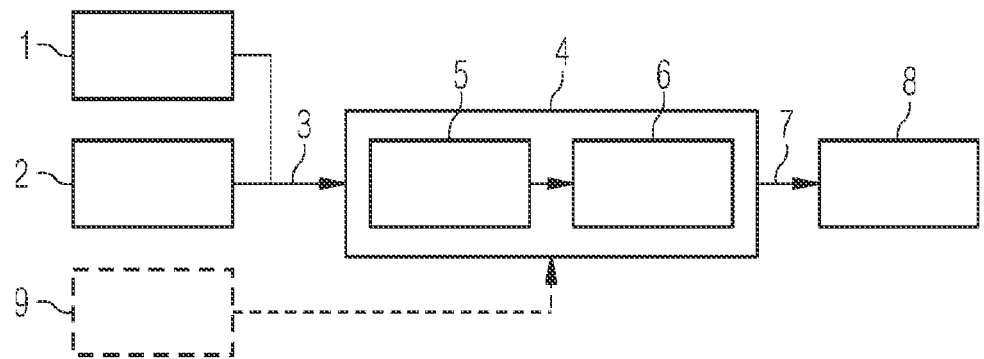
FIG. 3 is a diagram depicting a known R2RML system.
Figure 4:
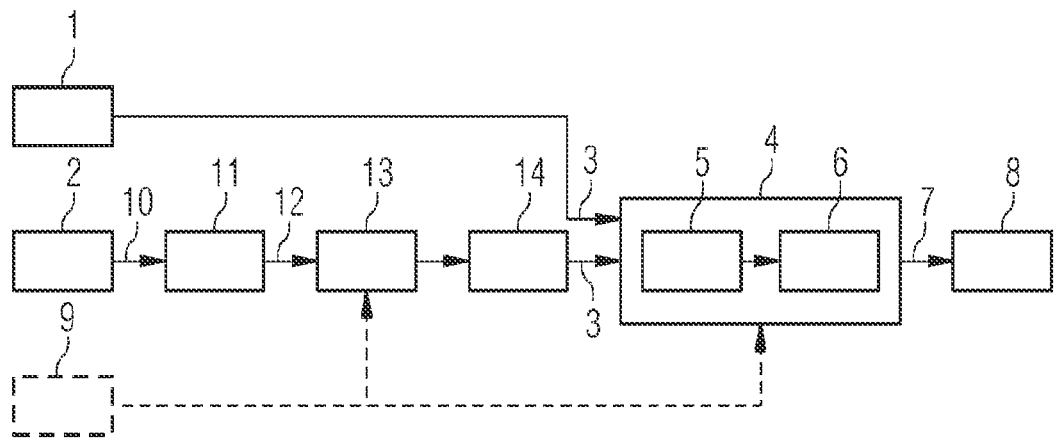
FIG. 4 is a diagram depicting an example system expanded by an R2RML unit incorporating teachings of the present disclosure.

FIG. 4—with reference to the illustration of the prior art in FIG. 3—shows the scheme expanded by an R2RML unit 13 incorporating teachings of the present disclosure. In the course of the preprocessing, which contains at least the elements or method steps 10 to 14, element "2" known according to this example from FIG. 3, the R2RML unit for R2RML mapping, creates a second, checked and improved R2RML unit 14 for R2RML mapping. To this end, the original unit of the first R2RML mapping file 2 is transmitted, via the interface 10, to an additional R2RML parser 11, which forwards its results, via the interface 12, to the R2RML unit 13 for the quality check and improvement, which in turn creates therefrom the second R2RML mapping file 14, which is transmitted to the R2RML module 4 via the interface 3. The elements of the R2RML module 4 are unchanged from the prior art, as shown in FIG. 3.

Figure 5:
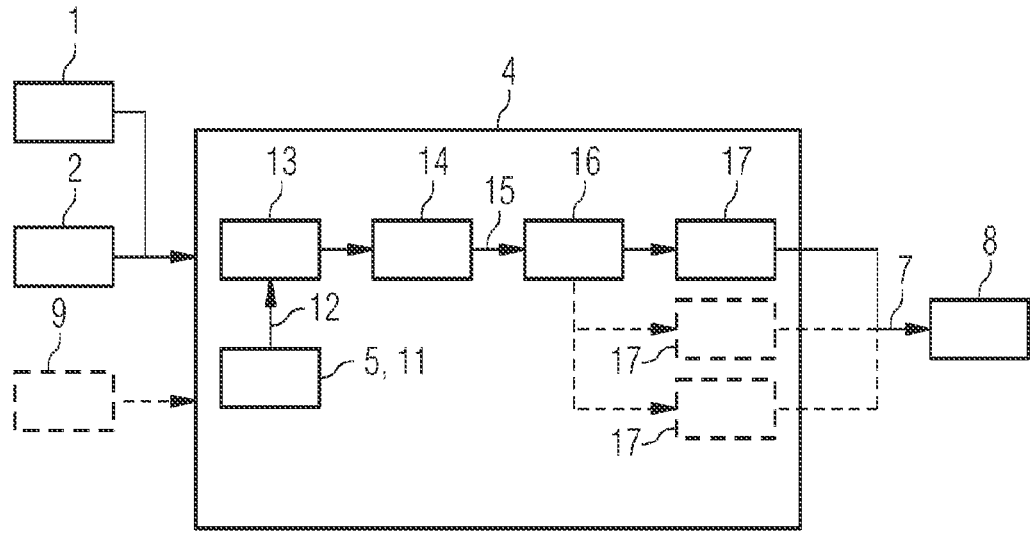
FIG. 5 is a diagram showing an example system incorporating teachings of the present disclosure.

FIG. 5 shows another example embodiment, in which not the preprocessing but rather the elements of a conventional R2RML module 4 are supplemented. Of course, both embodiments, as shown in FIGS. 4 and 5, may also be used in combined form. In this case, following the breaking down and conversion of the relational data, comprising sensor data, by one or more R2RML parsers 5 and/or 11, the checking and improvement of the first R2RML file is carried out in the R2RML unit 13 for the quality check and/or quality improvement, the result is transmitted via the interfaces 12 and/or 16 and a second, improved R2RML mapping file 14 is thus either supplied to the R2RML module 4 and/or is able to be transmitted within the R2RML module 4 to an R2RML unit (16).

FIG. 5 does not use an additional R2RML parser, but rather an R2RML parser 5 or 11 transmits the result of the conversion according to the first R2RML mapping via the interface 12 to the R2RML unit 13 for the quality check and improvement. Like in the exemplary embodiment shown in FIG. 4, this generates therefrom a second R2RML mapping 14, which controls a further R2RML unit 16 via the interface 15. In the R2RML unit 16, optimization of the R2RML mapping is started, by way of which, based on the received results, through comparison with computed data,
  parallelism and/or distribution of the ongoing assignment is initiated,
  clustering of the paths/node points is carried out
  identification of isolated and/or non-connected nodes is carried out and for example the deletion thereof and/or removal of unused classes/groups from an ontology is able to be achieved.

Specific advantages of the data transformation disclosed here by way of the improved, second R2RML mapping file 14 are in particular:
  mapping transformations are able to be carried out in parallel or in a distributed manner. This makes it possible to increase both performance and scalability.
  Planning of the assignment execution is made possible by recognizing non-connected nodes in relation to assignments between nodes in the R2RML mapping.
  Efficient validation of quality is made possible during the mapping phase itself, and not just after the generation of data/knowledge graphs.
  Recognition and resolution of various types of discrepancies in mappings in relation to semantics becomes possible.
  Finally, recognition and resolution of various types of discrepancies in mappings in accordance with the ontology is made possible.

The R2RML unit 13 for performing the quality check and improvement of the R2RML mapping automatically carries out the following method steps with the aid of the second mapping file 14:

Adapting the size of the node points to the number of paths connected to this node point, Identifying communities, that is to say groups of connected nodes, for example by way of the Louvain method for optimizing modularity.

Figure 6:
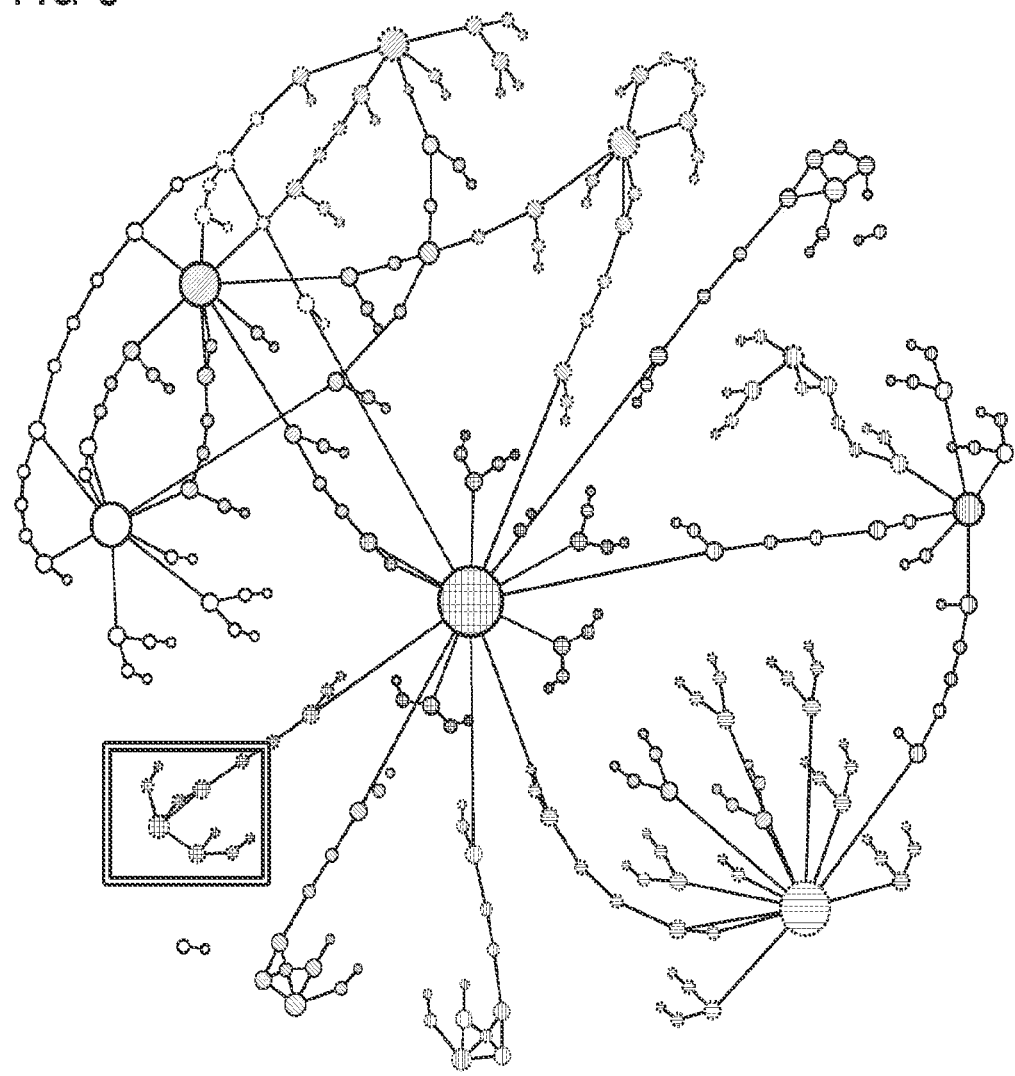
FIG. 6 is a diagram showing an example display incorporating teachings of the present disclosure.
Figure 8A:
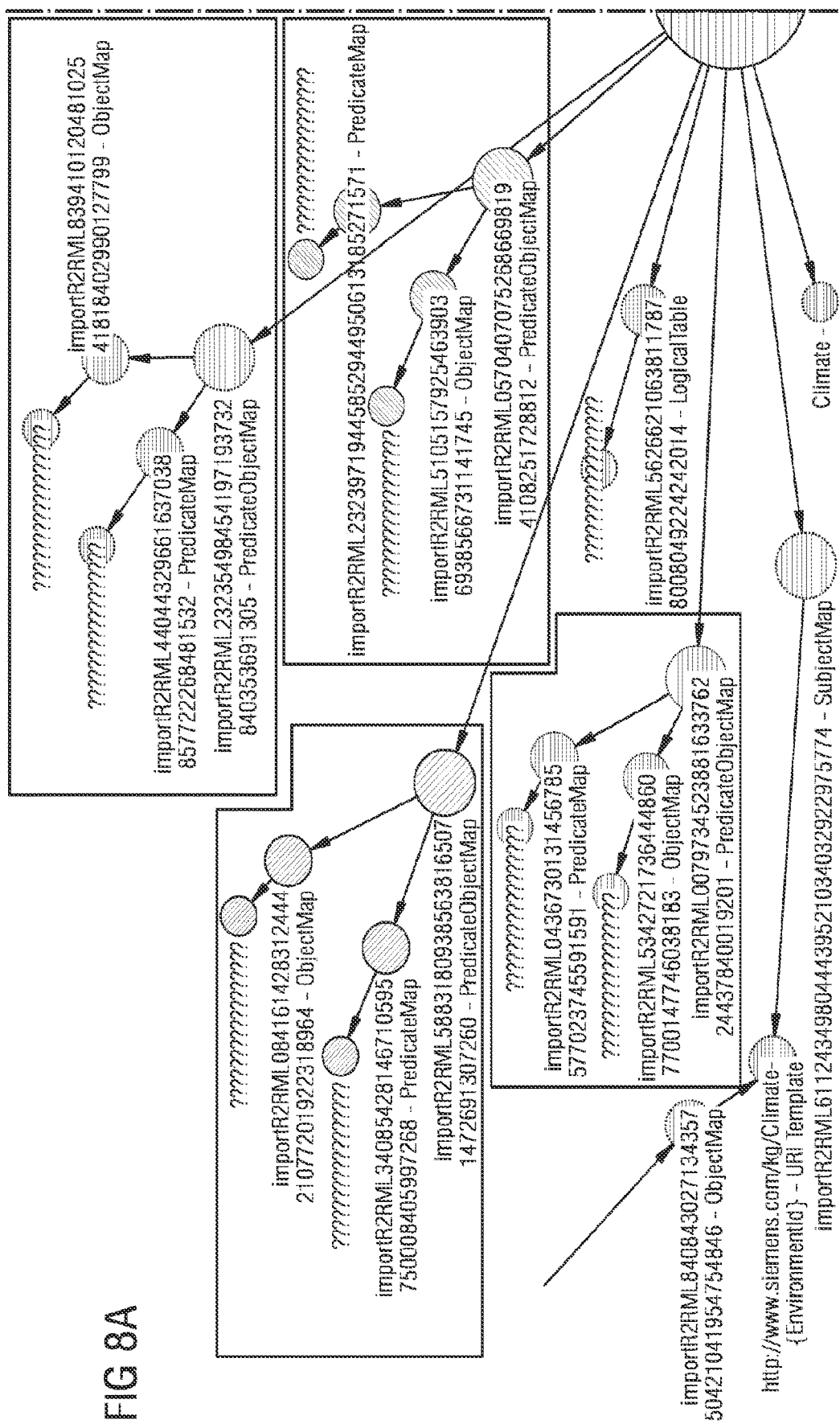
FIGS. 8A and 8B are a diagram showing application of the teachings of the present disclosure.
Figure 8B:
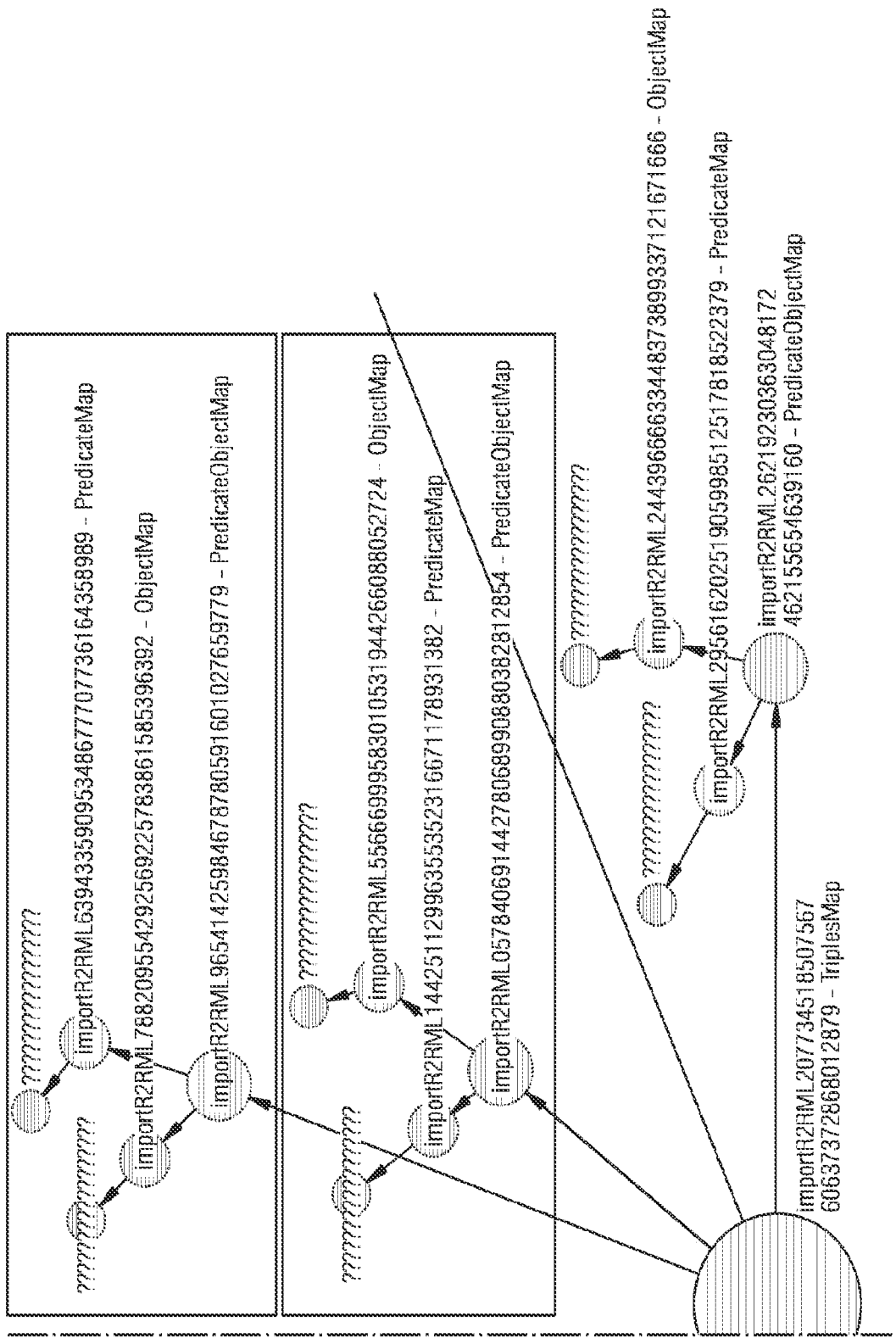
Figure 9:
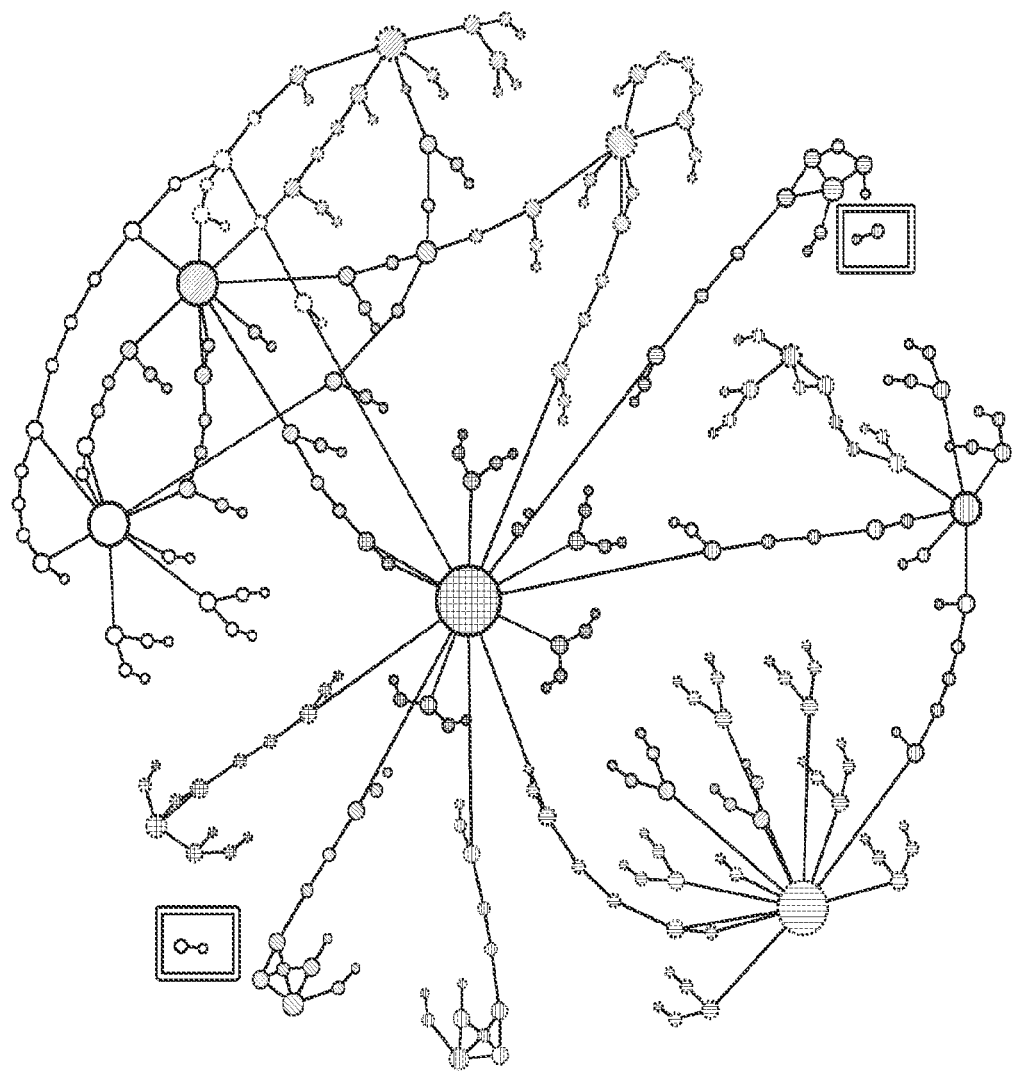
FIG. 9 is a diagram showing an example display incorporating teachings of the present disclosure.

In some embodiments, an R2RML unit 9 with suitable ontology is used to display the second R2RML mapping file (14) on a display device, which may be an imaging device, such as for example a monitor. FIGS. 6 and 9 correspond to this display. In this case, the display of the node points, which may be full or empty, is adapted to the number of paths connected to the node point, such that a node point from which a large number of paths depart is larger than a node point that connects only a few paths.

Figure 2:
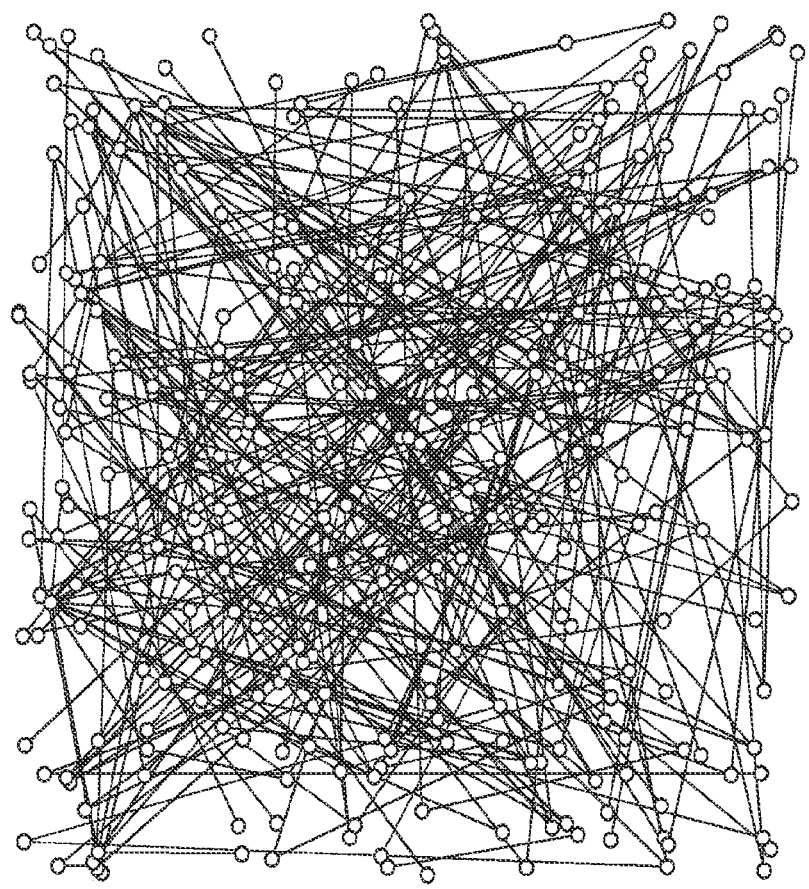
FIG. 2 is a drawing depicting a display showing an R2RML triple map.

In addition, the communities that are found, each comprising nodes and paths, are marked by the same color. Instead of the previously normal display of an R2RML mapping file, as illustrated in FIG. 2, following clustering and/or identification of the communities, it is thus possible to generate a second R2RML mapping file 14, as shown in FIG. 6.

FIG. 7 shows the marked and magnified detail from FIG. 6. It becomes apparent here how, in accordance with the method for generating a second R2RML mapping file, the clusters and/or communities are able to be identified more clearly. The representation shown in FIG. 7 offers in particular a few useful insights into mapping, the most interesting of which are listed below.

1. Dependencies within and between mapping rules become obvious.
2. The various clusters/communities refer to individual assignment rules—corresponding to 1 TriplesMap or a set of related assignment rules—corresponding to multiple TriplesMaps.

In some embodiments, an R2RML unit for performing the quality check and/or quality improvement 13 and the resulting second R2RML mapping file 14, as shown in FIGS. 4 to 8, may optimize the R2RML assignment process in many ways:

1. When executing and/or generating the mapping, in particular in the R2RML mapping parser:

The automatic creation of assignments through R2RML is a capacity-intensive process. According to the exemplary embodiment shown in the figures, based on the number of data and assignments, the identified clusters/communities in the assignment graph serve as blocks that are executed in parallel or sequentially, as a result of which the performance and scalability when creating the mappings in the processor are improved.

B) Since the dependencies within and between the assignment rules (mapping rules) are obvious due to the display—in comparison with the display for example in FIG. 2—the assignment graph may be interpreted as a dependency graph or even as a dependent acyclic graph, which enables planned execution of assignment rules. By way of example, the blocks with a border are all independent blocks per se that are able to be executed in any order. Following successful execution of all of these blocks, the dependent block—illustrated as a large circle with the ID that ends with "12879 TriplesMap", is able to be assigned, see FIGS. 8A and 8B.

2. When improving the quality of the assignments:

According to the R2RML process, there is a requirement in the R2RML mapping parser for each assignment rule to contain at least one TriplesMap (subject, predicate, object), which in turn contains a reference to a logical table, SubjectMap and at least one predicate/object map. In some embodiments, this is checked via a SPARQL query. The assignments that do not meet these requirements are therefore able to be identified easily.

Based on the visualization, which may also take place automatically within the processor without a display device, it is possible to easily recognize non-connected paths and/or nodes. These interruptions may have various causes:

A) incomplete assignments, such as for example when the subject map, object map, predicate map and/or the object/predicate map, although they are defined, are not executed, linked and/or no reference was made thereto in the assignment. Following recognition of these errors, these may be repaired by adding references to the non-connected nodes with the aid of SPARQL update queries. This may take place automatically or manually through a visualization of the defective mapping, see FIGS. 8A and 8B.

B) unused R2RML blocks: this occurs when subject map, object map, predicate map and/or the object/predicate map, although they are defined, are no longer needed, that is to say are redundant. This may occur for example in the case of (legacy) assignments in which multiple changes have been made that have however not been updated consistently. These errors may be recognized—again with the aid of corresponding SPARQL update queries—and be rectified by removing the R2RML mapping blocks from the second R2RML mapping file.

3. In the quality management of the R2RML mapping files in relation to the ontology:

During the preparation performed by the R2RML mapping parser, according to one advantageous embodiment of the invention, it is proposed to apply an ontology, wherein the "OWL—Web Ontology Language"—a specification of the World Wide Web Consortium, may for example be applied. This results in the possibility of additional findings from the second R2RML mapping file and/or else a further quality check.

After the ontology has been applied, it is for example additionally proposed to perform the same method steps as when finding the clusters and/or communities—for example using the Louvain method. When the assignment is consistent and compatible with the ontology, it may then be assumed that the following requirements are met: by way of example, an R2RML predicate of the mapping should correspond to valid data and/or object properties in the ontology, and an R2RML class in the mapping should correspond to a valid class in the ontology.

Non-connected nodes and/or paths may in this case indicate the following circumstances:

An ontology expansion could be necessary, for example the ontology could be expanded and/or modified, in particular for example by adding and/or renaming classes and/or data/object properties due to defective and/or missing references in the mapping.

An ontology update could be necessary, for example a non-connected node could indicate removal of out-of-date classes and/or properties in the ontology, the ontology concepts, that is to say the classes, data and/or properties, as a result of which the ontology would be more up-to-date. Classes, data and/or object properties that have no references in the assignments may be thus both valid and necessary—that is to say up-to-date—or else belong to redundant concepts—that is to say out-of-date.

These relationships are also able to be retrieved in particular by preparing the R2RML mapping parser result in the processor 13 from FIGS. 4 and 5, as a result of which, according to the present invention, a second R2RML mapping file 14 is created and is able to be used for the further assignment—see FIGS. 4 and 5. If using an embodiment in which the processor for performing the quality check and/or quality improvement is located within the R2RML module—see FIG. 5—then these results may in particular also be used automatically to optimize the method, that is to say parallelism of independently running cluster findings, removing non-connected nodes and/or paths following corresponding SPARQL update queries.

A "mapping" corresponds to an "assignment". An R2RML mapping is accordingly also an R2RML assignment. An R2RML mapping file is an R2RML assignment map, as visualized, that is to say illustrated, for example in FIGS. 2, 6, 7 (only detail), 8 and 9.

Optimizing a mapping file according to the exemplary embodiment shown in FIG. 5, in which use is made of an R2RML module that comprises, within the module, a processor 16 for performing the optimization based on the second mapping file 14.

It is not necessary for these relationships to be visualized to optimize the entire R2RML transformation process using the processor 16 for performing the optimization.

Using the R2RML method shown here, information is retrieved from the representation and/or the data generation of an R2RML mapping method, which enables error analysis on the automated R2RML assignment of relational data to RDF data blocks and possibly as a result creates at least one optimization possibility for the automated assignment of relational data to RDF data blocks. To this end, a display, visualization and/or representation of an R2RML mapping is created, referred to here as second R2RML mapping file 14, which provides a possibility for measuring the completeness and/or the quality of the R2RML mapping that takes place.

Using identification information—for example in the second R2RML mapping file (14)—it is possible in particular to provide evidence that indicates that the corresponding data block has been inserted by a specific node or that indicates its origin.

The relational data are for example databases of devices of a technical system and/or an industrial installation and/or an automation network and/or a manufacturing installation. In this case, the devices may for example be field devices or devices in the Internet of Things.

An output and/or display device, as is optionally part of the device disclosed here for preparing relational data to form data blocks as a database of a graph database and/or to form RDF data blocks, is particularly suitable for displaying R2RML triple maps with node points and paths that graphically reproduce an R2RML triple link.

A display device in this case in particular comprises an imaging component, such as a screen, a monitor or the like.

The number of paths per node point may in particular be recognized by the size of the node points and shared identity of the paths and possibly be made visible by colors in a visualization, so that A) It is able to be recognized automatically—in the processor 13—which paths "lead to nothing", that is to say are defective, and/or
B) It is able to be compared automatically—likewise in the processor 13—whether all relationally received data are also assigned to at least one RDF data block, and in this case provision is made for at least one
communication interface, which is configured such that it receives results from A) and/or B) and forwards therefrom a second R2RML mapping file 14, either during the preprocessing or within the R2RML transformation method, to a further processor 16 within the R2RML module, which,
based on the received results, through comparison with computed data,
is able to initiate parallelism of the ongoing assignment
is able to perform clustering of the paths/node points
is able to perform identification of isolated and/or non-connected nodes and for example bring about the deletion thereof and/or removal of unused classes/groups from an ontology. On the other hand, this identification may also be used to accordingly expand, update and/or modify an ontology.

The implementation of at least one R2RML unit and possibly also further R2RML units is proposed, wherein the quality of an R2RML mapping file is recognized and improved, optimization of the execution of the R2RML mapping is able to be initiated and possibly also the R2RML mapping is able to be visualized following the quality improvement and possibly following the optimization of the R2RML method.

Due to the fact that, as a result of the second optimized R2RML mapping, some R2RML mappings of incorrect nodes and/or paths and/or nodes and/or paths that do not lead any further are spared, the teachings herein generally enable an energy saving for the transformation system. Since fewer data are analyzed in principle, because they are deleted and/or removed by the second mapping, because the second mapping does away with superfluous paths and/or nodes, the transformation method becomes faster overall and thus more time-efficient, energy-efficient and cost-efficient. The order of magnitude of the saving, respectively the optimization, varies. For some data, the second mapping removes a large amount, for other data it does not remove as much, and this depends on the form of the received relational data that are assigned in the first parser R2RML mapping step.

The methods and the R2RML modules incorporating teachings of the present disclosure make it possible to increase the energy efficiency of the automated transformation of relational data into machine-readable data in the RDF format. This transformation is necessary whenever first-generation data, be these "freshly" generated data by monitoring devices such as sensors, analysis devices, etc. on an existing production line and/or data from "old devices" with a long service life, which are generated in out-of-date formats—for example in the case of gas turbines and/or energy distribution devices with a service life of 30 years and more—are transformed and thus made accessible to further automated processing and possibly control and regulation.

LIST OF REFERENCE SIGNS 1 relational database
2 R2RML unit with R2RML mapping file
3 interface to the R2RML module
4 R2RML module 5 R2RML mapping parser of the R2RML module
6 RDF generation memory
7 final interface of the R2RML module
8 memory for database of a graph database or RDF file
9 R2RML unit with ontology for visualizing the mapping
10 second interface to the R2RML parser of the preprocessing
11 R2RML mapping parser of the preprocessing
12 third interface to the quality checker, which is either part of the preprocessing or is located within the R2RML module
13 R2RML unit for performing the quality check and/or quality improvement on the R2RML mapping
14 improved, second R2RML mapping file
15 fourth interface within the R2RML module
16 optimized R2RML parser
17 memory 1, 2, . . . n for RDF generation 1, RDF generation 2 . . . RDF generation n

What is claimed is:

1. An R2RML module for preparing relational data to form RDF data blocks, the module comprising:
interfaces a preprocessing means, a display, and a parser;
one or more processors configured to generate an RDF data block;
one or more R2RML parsers for receiving relational data, breaking down the relational data, and converting them the relational data to first R2RML mappings;
a storage area for storing the generated RDF data blocks, wherein the R2RML module using a first R2RML parser assigns received relational data to RDF data blocks using the R2RML mapping rules and for storing them in the storage area as corresponding RDF data blocks;
wherein the one or more processors are configured to generate a second R2RML mapping as a result of a quality check, downstream of the first R2RML parser, on the first R2RML mapping performed by an R2RML unit, and the second R2RML mapping, during the preparation of the relational data into RDF data blocks, automatically stops the processing of relational data that are not to be resolved and thus optimizes the energy efficiency of the preparation.

2. The R2RML module as claimed in claim 1, wherein the interfaces receive, via an R2RML unit within the R2RML module, the second R2RML mapping file.

3. The R2RML module as claimed in claim 2, wherein the R2RML unit, after receiving the second R2RML mapping file, automatically starts an optimization process.

4. The R2RML module as claimed in claim 1, wherein the R2RML unit starts a process for optimizing mapping on the basis of the second R2RML mapping file.

5. The R2RML module as claimed in claim 4, wherein the optimization process in the R2RML module triggers generation of multiple RDF data block generations, and the data blocks are stored in corresponding storage areas.

6. The R2RML module as claimed in claim 4, wherein the optimization process in the R2RML module triggers the parallel and simultaneous generation of multiple RDF data block generations, and the data blocks are stored in corresponding storage areas.

7. The R2RML module as claimed in claim 1, wherein the interfaces connect the R2RML module to a processor for preprocessing the R2RML mapping of relational data.

8. The R2RML module as claimed in claim 1, wherein the interfaces connect to a processor for depicting buffer-stored data of one or more first and/or second R2RML mappings using an ontology for visualization.

9. The R2RML module as claimed in claim 8, further comprising an output device connected to the R2RML unit; and
Wherein the R2RML modules visualizes the result of the comparison of the second R2RML mapping file with the ontology.

10. The R2RML module as claimed in claim 1, wherein the R2RML unit provides an ontology for comparison with the second R2RML mapping file.

11. A computer-aided method for transforming data in a relational database, containing sensor measurements, into RDF data blocks of a graph database, the method comprising:
providing relational data in a relational database;
providing a first R2RML mapping file;
breaking down and converting the relational data with the aid of the first R2RML mapping file using a first R2RML mapping parser;
generating at least one generation of RDF data blocks; and
storing the generation of RDF data blocks as a database for a graph database and/or an RDF file;
after the data have been broken down and converted by a first R2RML parser, checking a quality of the obtained R2RML mapping; and
creating a second R2RML mapping file, on the basis of which the relational data are broken down and converted into RDF data blocks;
wherein the second R2RML mapping, during the preparation of the relational data into RDF data blocks, automatically stops the processing of relational data that are not to be resolved and thus optimizes the energy efficiency of the preparation.

12. The method as claimed in claim 11, wherein the second R2RML mapping file is generated in the preprocessing.

13. The method as claimed in claim 11, wherein the second R2RML mapping file is generated within the R2RML module.

14. The method as claimed in claim 11, wherein an optimized transformation method of the data mapping is set in process using the additional R2RML unit.

15. The method as claimed in claim 14, wherein multiple RDF data block generations are generated using the optimized transformation method of the R2RML mapping.

16. The method as claimed in claim 15, wherein multiple RDF data block generations are generated simultaneously, using the optimized transformation method of the R2RML mapping.

17. The method as claimed in claim 11, further comprising routing the result of the R2RML mapping parser to a further R2RML unit for comparison with an ontology and possibly for visualization.

18. A tangible, non-transitory computer program product comprising a machine-readable data carrier storing instructions, wherein, when the program code is executed by a processor, the instructions transform data in a relational database, containing sensor measurements, into RDF data blocks of a graph database, by:
providing relational data in a relational database;
providing a first R2RML mapping file;
breaking down and converting the relational data with the aid of the first R2RML mapping file using a first R2RML mapping parser;
generating at least one generation of RDF data blocks; and storing the generation of RDF data blocks as a database for a graph database and/or an RDF file;

after the data have been broken down and converted by a first R2BML parser, checking a quality of the obtained R2RML mapping; and creating a second R2RML mapping file, on the basis of which the relational data are broken down and converted into RDF data blocks;

wherein the second R2RML mapping, during the preparation of the relational data into RDF data blocks, automatically stops the processing of relational data that are not to be resolved and thus optimizes the energy efficiency of the preparation.

* * * * *